(12) United States Patent
Carbine et al.

(10) Patent No.: US 6,378,061 B1
(45) Date of Patent: Apr. 23, 2002

(54) APPARATUS FOR ISSUING INSTRUCTIONS AND REISSUING A PREVIOUS INSTRUCTIONS BY RECIRCULATING USING THE DELAY CIRCUIT

(75) Inventors: Adrian Carbine; Glenn J. Hinton, both of Portland, OR (US); Frank S. Smith, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/150,784

(22) Filed: Nov. 12, 1993

Related U.S. Application Data

(63) Continuation of application No. 07/630,536, filed on Dec. 20, 1990, now abandoned.

(51) Int. Cl.[7] .................................................. G06F 9/30
(52) U.S. Cl. ...................... 712/200; 712/214; 712/215; 712/220; 712/227
(58) Field of Search ............................... 712/200, 227, 712/220, 28, 30, 32, 34, 214, 215

(56) References Cited

U.S. PATENT DOCUMENTS

| | | | | |
|---|---|---|---|---|
| 4,314,349 A | * | 2/1982 | Batcher ....................... | 364/716 |
| 4,388,682 A | * | 6/1983 | Eldridge ...................... | 712/211 |
| 4,394,736 A | * | 7/1983 | Bernstein et al. ............ | 395/400 |
| 4,399,505 A | * | 8/1983 | Druke et al. ................. | 395/375 |
| 4,591,972 A | * | 5/1986 | Guyer et al. ................. | 395/375 |
| 4,635,194 A | * | 1/1987 | Burger et al. ................ | 395/375 |
| 4,745,544 A | * | 5/1988 | Renner et al. ............... | 395/375 |
| 4,928,223 A | * | 5/1990 | Dao et al. .................... | 395/375 |
| 5,101,344 A | * | 3/1992 | Bonet et al. ................. | 712/234 |
| 5,136,696 A | * | 8/1992 | Beckwith et al. ............ | 395/375 |
| 5,488,714 A | * | 1/1996 | Skidmore .................... | 395/707 |
| 5,732,234 A | * | 3/1998 | Vassiliadis et al. .......... | 712/200 |

OTHER PUBLICATIONS

Yoshida "A Strategy for Avoiding Pipeline Interlock Delays in a Microprocessor" IEEE 1990, pp. 14–19.*

* cited by examiner

Primary Examiner—Daniel H. Pan
Assistant Examiner—Dzung C Nguyen
(74) Attorney, Agent, or Firm—Blakely, Sokoloff, Taylor & Zafman LLP

(57) ABSTRACT

An instruction decoder that issues new instructions by driving a machine bus (110) with the correct information during each clock cycle. This information is either extracted from the current instruction to be executed, or is recycled from the previous contents (106) of the machine bus when a scoreboarding operation has been performed. Mousetrap multiplexer (104) chooses between several sources of opcode and operand fields and routes them to the machine bus (110) through several translation stages and multiplexers. The decision of which source to use is based on what kind of instruction is currently being looked at by the instruction queue in the instruction fetch unit. The instruction queue notifies the instruction decoder that the next instruction is to be either a RISC operation (including register, memory, and/or branch instructions) or an instruction which is part of a microcode flow. If a complex macroinstruction flow is in progress, its operands can be accessed through alias registers. This allows indirect access to a source or destination register specified by the operands of the macrocode instruction or the opcode of the macroinstruction while executing a sequence of microinstructions. These aliased operands are maintained by the macroinstruction aliasing logic (100).

5 Claims, 2 Drawing Sheets

APPARATUS FOR ISSUING INSTRUCTIONS AND REISSUING A PREVIOUS INSTRUCTIONS BY RECIRCULATING USING THE DELAY CIRCUIT

CROSS REFERENCES TO RELATED APPLICATIONS

This is a continuation of application Ser. No. 07/630,536, filed Dec. 20, 1990, now abandoned.

This application is related to the following patent applications:
U.S. Pat. No. 5,185,872 "Register Scoreboarding Extended to all Multiple-cycle operations in a Pipelined Microprocessor", granted Feb. 9, 1993;
U.S. Pat. No. 5,023,844 "Six-way Access Ported RAM Array Cell", granted Jun. 11, 1991; "Data Bypass Structure in a Microprocessor Register File to Ensure Data Integrity", Ser. No. 07/488,254, filed Mar. 5, 1990 now abandoned; "An Instruction Pipeline Sequencer With a Write-back Path" Ser. No. 07/630,535, filed Dec. 20, 1990; "A Microprocessor in Which Multiple Functions are Performed During Each Pipeline Stage" Ser. No. 07/630,499, filed Dec. 20, 1990 now U.S. Pat. No. 4,001,291; "A Pipeline Sequencer With Alternate IP Selection when a Branch Lookahead Prediction Fails" Ser. No. 07/686,479 filed Apr. 17, 1991; "An Instruction Decoder Having Multiple Alias Registers Whoch Provide Indirect Access In Microcode to User Operands" Ser. No. 07/630,497, filed Dec. 20, 1990 now U.S. Pat. No. 5,222,244; "High Bandwidth Output Hierarchical Memory Store Including a Cache, Fetch Buffer and ROM" Ser. No. 07/630,534, filed Dec. 20, 1990 now U.S. Pat. No. 5,313,605; all assigned to Intel Corporation.

BACKGROUND OF THE INVENTION

1. Field of the Invention

The invention relates to data processing systems and more particularly to an apparatus for issuing multiple instructions from sveral sources and in an order that ensures that the sources and destinations of the instructions do not collide with one another.

2. Description of the Related Art

Users of modern computers are demanding greater speed in the form of increased throughput (number of completed tasks per uinit of time) and increased speed (reduced time it takes to complete a task). The Reduced Instruction Set Computer (RISC) architecuture is one approach system designers have taken to achieve this. While there is no standard definition for the term Reduced Instruction Set Computer (RISC) as opposed to the usual computer architecture which can be called Complex Instruction Set Computer (CISC), there are some generally accepted characteristics of a RISC machine. Generally a RISC machine can issue and execute an instruction per clock. In a RISC machine only a very few instructions can access memory so most instructions use on-chip registers. So, a further RISC characterstic is the provision of a large number of registers on chip. In a RISC machine the user can specify in a single instruction two sources and a destination.

Having to fetch large numbers of instructions from off chip memory reduces bus bandwidth. When issuing multiple instructions from several sources on a machine bus, sometimes the destination operands of the instructions collide with one another resulting in a scoreboard hit condition. When this occurs in the prior art apparatus, the instruction is canceled and an additional fetch is required in order to reissue the instruction on the machine bus after a scoreboard hit is removed.

It is an object of the invention to provide an apparatus for issuing, on a machine bus, multiple instructions from several sources, for detecting if destination operands of the instructions collide with one another and for reissuing an instruction on the machine bus immediately after a collision condition related to that instruction is removed.

SUMMARY OF THE INVENTION

Briefly, the above objects are accomplished in accordance with the invention by providing instruction sequencer with a microcode translation ROM (112) for providing initial instructions in microcode flows and a mousetrap multiplexer (104) having a first input, a second input and an output. The first input of the mousetrap multiplexer (104) is connected to an instruction bus (98) and the the second input of the mousetrap multiplexer (104) is connected to the microcode translation ROM (112). The output of the mousetrap multiplexer (104) is connected to the machine bus (110). The mousetrap multiplexer (104) includes means for selecting at its inputs from one of either the instruction bus (98), or microcode translation ROM (112), an operand and an opcode field and for driving the selected operand and opcode field onto the machine bus (110).

The invention has the advantage of providing a superscaler architecture in that the machine can issue and execute more than one instruction per clock.

The invention has the advantage that since the microinstructions of the microcode are virtually identical to the RISC macroinstructions, a permanent cache of routines is stored on-chip that would be in most RISC machines have to come from off-chip.

The invention has the advantage that it is possible to issue two instructions per clock, which eliminates the bus bandwidth problems that would exist if all that code had to be fetched from off-chip.

BRIEF DESCRIPTION OF THE DRAWINGS

The foregoing and other objects, features, and advantages of the invention will be apparent from the following more particular description of a preferred embodiment of the invention as illustrated in the accompanying drawings, wherein.

DESCRIPTION OF THE PREFERRED EMBODIMENT

U.S. Pat. No. 4,891,753 "Register Scoreboarding on a Microprocessor Chip" granted on Jan. 2, 1990 and assigned to Intel Corporation describes a microprocessor which has four basic instruction formats that must be word aligned and are 32-bits in length. The REG format instructions are the register-to-register integer or ordinal (unsigned) instructions. The MEM format instructions are the loads, stores, or address computation (LDA) instructions. The MEM format allows an optional 32-bit displacement. The CTRL format instructions are the branch instructions. The COBR format is an optimization that combines a compare and a branch in one instruction. The microprocessor in which the present invention is embodied has a 32-bit linear address space and has 32 general purpose registers. Sixteen of these registers are global and 16 are local. These 16 local registers are saved automatically on a call and restored on each return. The global registers, like the registers in more conventional microprocessors, retain their values across procedure boundaries.

Figure 1:
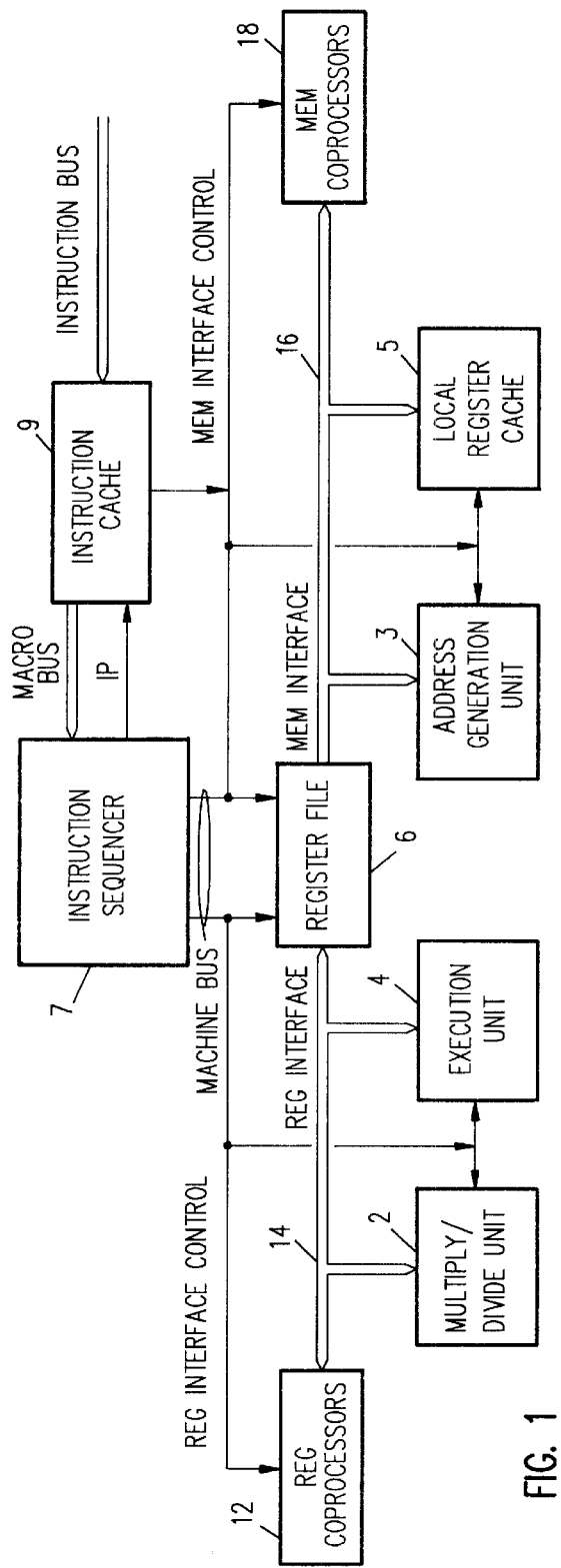
FIG. 1 is a block diagram of the microprocessor in which the present invention is embodied.
Figure 2:
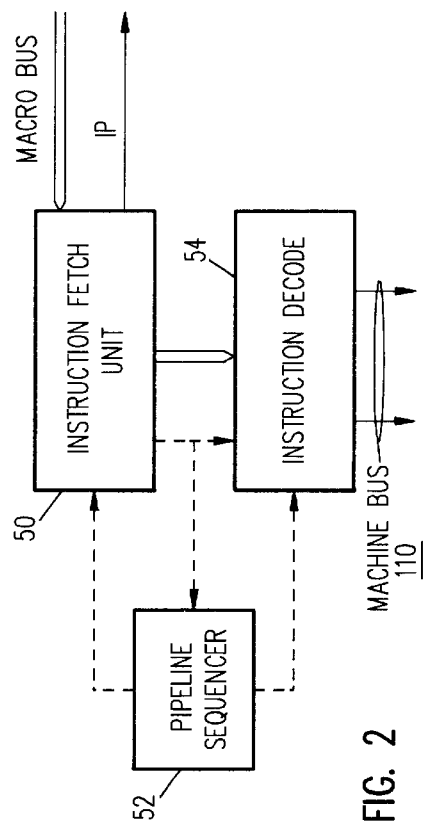
FIG. 2 is a block diagram of the instruction sequencer of the microprocessor shown in FIG. 1; and, FIG. 3 is a block diagram of the instruction decoder of the instruction sequencer shown in FIG. 2.

As shown in FIG. 1 the microprocessor in which the present invention is embodied has seven basic units. They are:

The Instruction Sequencer (IS-7)
The Register File (RF-6)
The Execution Unit (EU-4)
The Multiply/Divide Unit (MDU-2))
The Address Generation Unit (3))
The on-chip RAM/Stack Frame Cache (I-cache 9)

These units are briefly described below. For more detailed information about each of these units refer to the above-identified copending applications.

Instruction Cache and ROM (I-Cache)

This unit (9) provides the Instruction Sequencer (7) with instructions every cycle. It contains a 2-way set-associative instruction cache and a microcode ROM. The I-Cache and ROM are essentially one structure. The ROM is an always-hit portion of the cache. This allows it to share the same logic as the instruction cache, even the column lines in the array. The I-Cache is four words wide and is capable of supplying four words per clock to the Instruction Sequencer (IS) over the macro bus. It consistently supplies three or four words per clock regardless of the alignment of the instruction address. The I-Cache also contains the external fetch handling logic that is used when an instruction fetch misses the I-Cache.

Instruction Sequencer (IS)

The IS decodes the instruction stream and drives the decoded instructions onto the machine bus which is the major control bus. The instruction sequencer (IS-7) is shown in more detail in FIG. 3. It includes the Fetch Unit (IFU-16), the Instruction Decoder (I-50D) and the Pipeline Sequencer (PS-54). The instruction sequencer (7) decodes the incoming four instruction words from the I-Cache. It can decode and issue up to three instructions per clock but it can never issue more than four instructions in two clocks. The instruction sequencer detects dependencies between the instructions and issues as many instructions as it can per clock. The IS directly executes branches. It also vectors into microcode for the few instructions that need microcode and also to handle interrupts and faults.

Register File (RF)

The RF (6) has 16 local and 16 global registers. The RF has 4 independent read ports and 2 independent write ports to support the machine parallelism. It also checks and maintains the register scoreboarding logic desribed in the above-identified U.S. Pat. No. 5,185,872.

Execution Unit (EU)

The EU (4) performs all the simple integer and ordinal operations of the microprocessor in which the present invention is embodied. All operations take a single cycle.

Multiply-Divide Unit (MDU)

The MDU (2) performs the integer/ordinal multiply, divide, remainder, and modulo operations. It performs an 8-bit-per clock multiply and a 1 bit-per-clock divide. A multiply has 4 clock throughput and 5 clock latency and a divide has 37 clock throughput and 38 clock latency.

Address Generation Unit (AGU)/Local Register Cache (LRC)

The AGU (3) is used to do the effective address calculations in parallel with the integer execution unit. It performs the load-effective-address instructions (LDA) and also does the address computations for loads and stores.

The Local Register Cache (LRC-5) maintains a stack of multiple 16-word local register sets. On each call the 16 local registers are transferred from the RF to the LRC. This allocates the 16 local registers in the RF for the called procedure. On a return the 16 words are transferred back into the RF to the calling procedure. The LRC uses a single ported RAM cell that is much smaller than the 6-ported RF cell. This keeps the RF small and fast so it can operate at a high frequency while allowing 8+ sets of local registers to be cached on-chip. With this LRC the call and return instructions take 4 clocks.

On-Chip Coprocessors

The microprocessor in which the present invention is embodied has two very high performance interfaces, the REG interface (14) and MEM interface (16). The REG interface is where all of the REG format instructions are executed. The EU (4) and MDU (2) described above are coprocessors (on-chip functional units) on this interface. Other units can be added, such as a Floating Point Adder and a Floating Point Multiplier. The REG interface has two 64-bit source buses and a 64-bit destination bus. These buses provide a bandwidth of 528 MB/sec for source data and 264 MB/sec for result data to and from this REG interface.

One instruction per clock can be issued on the REG interface. The operations can be single or multi-cycle as long as they are independently sequenced by the respective REG coprocessor (12). The coprocessors on this interface arbitrate among themselves if necessary to return their results. There can be multiple outstanding multi-cycle operations such as integer or floating point multiply and divide. The number outstanding is limited only by the number and nature (whether pipelined or not) of the REG coprocessors.

The MEM interface (16) is where all MEM format instructions are executed. It also connects the system to the memory coprocessor (18). The on-chip memory coprocessor can be a bus controller that connects to off-chip memory. The AGU (3) and LRC (5) mentioned above are coprocessors on the MEM interface. Other units can be added to this interface such as a TLB, a data cache, an on-chip RAM array, etc. One instruction per clock can be issued on this interface. The operations can be single or multi-cycle just as described above for the REG interface. The coprocessors on this interface arbitrate among themselves if needed to return their results.

The majority of all instructions executed use no microcode, they are directly issued like any other RISC machine. Microcode is used for a few instructions but mainly for fault, interrupt handling, and debug (trace) handling support. There are a few extra microinstructions that help speed up critical operations such as call and return and that access internal control registers, etc.

The Instruction Decoder

The instruction decoder (54) is responsible for issuing new instructions by driving the machine bus with the correct information during each clock cycle. This information is either extracted from the current instruction to be executed, or is recycled from the previous contents of the machine bus when a scoreboarding operation has been performed; the current instruction can be categorized either as a RISC macrocode instruction or as a RISC microinstruction which is part of a microcode flow. The instruction decoder translates macroinstructions into a common internal format and handles the macrocode operand aliasing mechanism by driving the machine bus with fields specified by a set of alias registers during a microcode flow which implements a complex microcode instruction. It also looks for opportunities to execute RISC instructions in parallel by attempting to drive the machine bus with simultaneous REG, and MEM operations.

Figure 3:
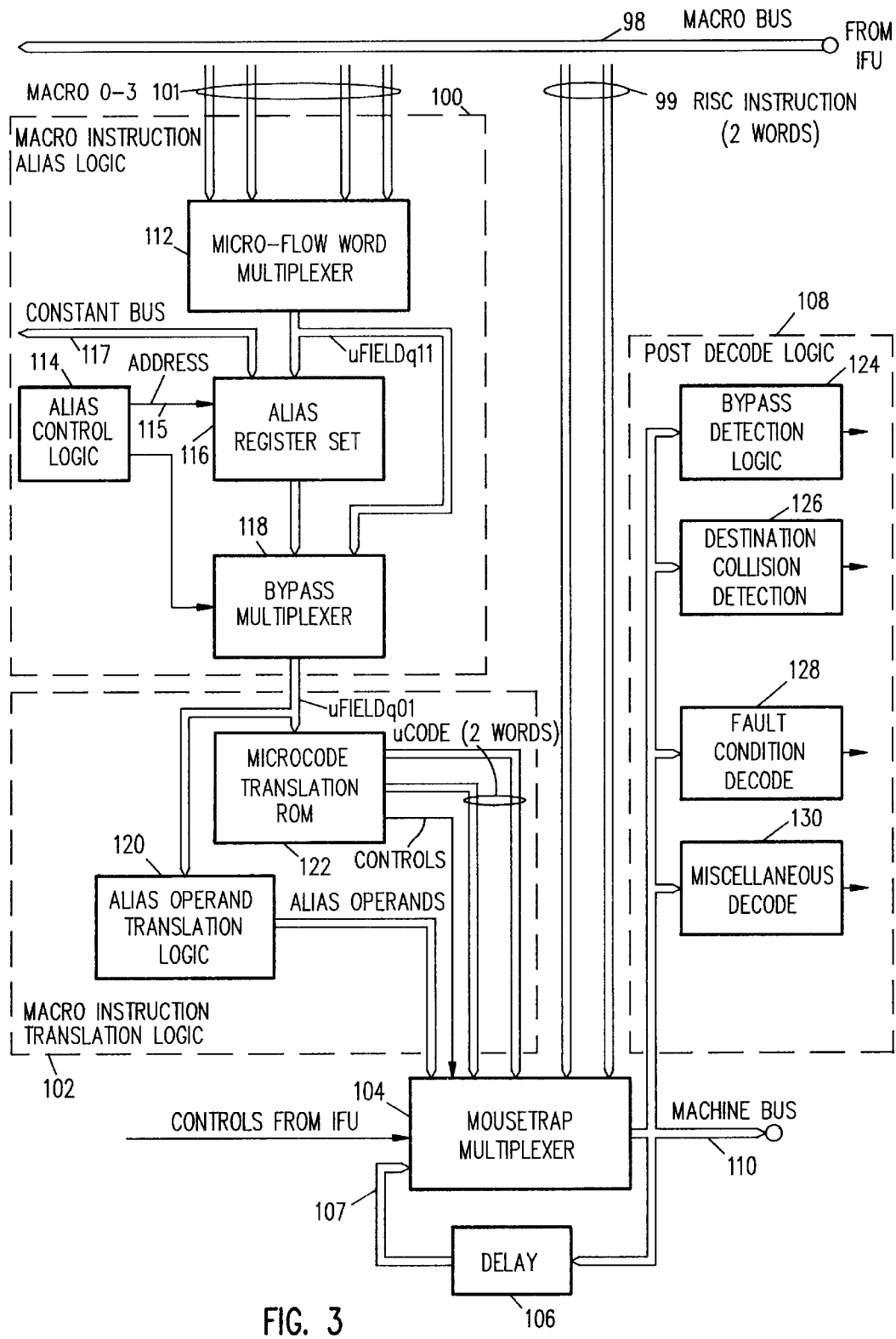

The instruction decoder includes the following major blocks, as shown in FIG. 3.

Macroinstruction Alias logic (100)
Macroinstruction translation logic (102)
Mousetrap multiplexer (104)
Post decoding logic (108)

The Instruction Decoder has the responsibility of driving the machine bus (110) with instructions during each clock cycle. To do this, it chooses between several sources of opcode and operand fields and routes them to the machine bus drivers through several translation stages and multiplexers. The decision of which source to use is based on what kind of instruction is currently being looked at by the instruction queue in the IFU (50). The instruction queue notifies the instruction decoder that the next instruction is to be either a RISC operation (including register, memory, and/or branch instructions) or an instruction which is part of a microcode flow.

If a complex macroinstruction flow is in progress, its operands can be accessed through alias registers. This allows indirect access to a source or destination register specified by the operands of the macrocode instruction or the opcode of the macroinstruction while executing a sequence of microinstructions. These aliased operands are maintained by the macroinstruction aliasing logic (100).

Microcode Translation ROM

To assist rapid branching into microcode, the instruction decoder manages a microcode translation ROM (122), which contains the first two or three instructions of each microcode flow. This mechanism allows the instruction sequencer to fetch and issue microcoded instructions without having to wait for the initial access into the main microcode ROM in the instruction cache (9). In some cases, short microcode sequences can be entirely executed in one clock cycle, and the microcode translation ROM allows such microcoded instructions to be issued and executed back-to-back, at a rate of one instruction per clock.

Mousetrap Multiplexer

The actual selection of which operand and opcode field is driven onto the machine bus (110) is done by the Mousetrap multiplexer (104). This block is a large multiplexer which receives information about what kind of operation is to be performed and drives the machine bus with field information chosen from one of several sources, including the macro busses (for RISC instructions), the alias field busses (for aliased microcode flows), and the translation ROM fields (for the first two instructions in microcode flows). It can also re-issue the previous instruction by recirculating the previous contents of the machine bus through the delay circuit (106). This is done whenever the system is waiting because of a scoreboard miss. As long as the system is waiting, the same information is repeatedly driven to the machine bus. When the scoreboard bit is cleared, the correct instruction is still available at the bus and the sequence proceeds normally. Another source of field information for the machine bus is the instruction fetch logic, which can force constants into those fields associated with a memory access in order to fetch an instruction from memory.

Post Decode Logic

The instruction decoder also contains post decode logic (108) which monitors the machine bus for situations which require attention, such as register bypassing (result forwarding), destination register collisions, and fault condition detection. Whenever a source register of an instruction is the same as the destination register of a previous instruction whose results are returning in the current clock, the register bypass controls are activated. Since the instruction pipeline allows no time for the contents of the register to be written before they are read out again, the instruction decoder instructs the register file to forward the result data from the return busses to the source busses without reading the source register. The destination collision detection logic (126) detects when there is a collision between a register operation destination and any memory operation using that same register issued in the same clock cycle. If this happens, the logic (126) causes the machine to be scoreboarded for one clock cycle to force the two operations to be done sequentially.

The fault condition decode logic (128) detects error conditions, such as unaligned RF accesses, invalid op-codes, and illegal register accesses.

Macroinstruction alias logic

The macroinstruction alias logic (100) selects an instruction word, provides indirect operand access through the alias operand translation logic, and converts a macroinstruction into a format which is consistent with the internal busses. It has a microflow word multiplexer (112), a macroinstruction alias logic (114, 116) and a bypass muliplexer (118).

The micro-flow word multiplexer (112) provides lookahead support for starting a microcode flow. This microcode flow is a flow of RISC microinstructions which implement complex macroinstructions which are similar to and sometimes identical to RISC macroinstructions. The multiplexer receives four 32-bit macroinstruction words, called macro0, macro1, macro2, and macro3, from the instruction queue in the instruction fetch unit (IFU). These instructions represent the next several operations which are to be executed as seen through the instruction queue's four-word fetch "window". From these four words, the first complex instruction is selected for use according to early information provided by translate lookahead logic located in the pipe sequencer, as summarized in table I. The selected macro flow instruction is driven onto the 32-bit microfield bus (ufieldq11) during ph1, and is used by the aliasing logic and can be bypassed to the translation ROM (112). Although the multiplexer is not used for RISC instructions, its input controls from the pipeline sequencer select the fourth word by default when all four input words are RISC. In this case uFIELDq11 is never used.

TABLE I

| Signal | Definition |
| --- | --- |
| Nextflw0 | word 0 contains the next complex instruction |
| Nextflw1 | word 1 contains the next complex instruction |
| Nextflw2 | word 2 contains the next complex instruction |
| Nextflw3 | word 3 contains the next complex instruction |

Although most macrocode instructions are RISC and can be executed in one clock cycle, some are complex and can only be accomplished by executing a sequence of microinstructions, referred to as a microcode flow. In order to maintain proper operand information during the execution of such instruction flows, the instruction decoder provides an alias mechanism to allow the macroinstruction to specify a set of resources (such as registers or sfr's) for use within the course of the microcode sequence. This is accomplished by maintaining an alias register set (116), which contains the operand locations for the current and next macroinstructions for each internal process. Since two register locations are maintained for the user process, back to back macroinstructions can be aliased and executed in successive clock cycles.

Data to be loaded into the alias register (116) comes from either the macroinstruction multiplexer (ufieldq11) or from the constant bus (117). The macroinstruction source is used when the alias register is to be loaded with a new complex instruction, as signaled by the alias control logic (114). The constant bus (117) is used to read and write the alias registers during debug or within microcode flows. The input address (115) of the register is derived from a the next process number and a translate block signal, which results in a 3-bit address. The alias register output address is similarly derived from a current process number and the current translate block signal. The alias register is addressed during phi and loaded during ph2, and is only operative if the machine is not scoreboarded, unless the pipeline is forced. The output of the bypass multiplexer (uFIELD q01) drives the microcode translation ROM (122) and the alias operand translation logic (120).

Bypass multiplexer

The bypass multiplexer (118) receives an instruction word from one of two sources. The instruction word can come from either the alias register set (116) or directly from the micro-flow word multiplexer (uFIELDq11), which effectively bypasses the alias logic. This is done only when macro mode is active and the alias input and output addresses are the same as indicated by the Brbypq11 signal. Once a macroinstruction is thus selected, the 16 bits of the instruction word which can contain opcode information are sent to the translation ROM (122), which uses these bits in its translation decode. Opcode multiplexing takes place in ph1.

Microcode translation ROM

The microcode translation ROM (122) contains the first two instructions of each microcode flow. Since it is very fast, this ROM allows the instruction sequencer quick access to its first operations, which can be executing while the next microinstructions are being fetched from the main microcode ROM, which has a longer latency as compared to the microcode translation ROM . Part of the microcode translation ROM are some control bits which are used by the mousetrap to aid in choosing an operand source.

Alias operand translation logic

The alias operand translation logic (120) receives data directly from the bypass multiplexer (118), and decodes several control signals which are used by the mousetrap in selecting alias operands.

A summary of the signals decoded from the ROM output is given in the table II below. These signals are also decoded and driven by the IFU when the machine is executing code from the microcode ROM or from off chip.

TABLE II

| Signal | Definition |
|---|---|
| Al0regu11 | enable dest field to be aliased |
| Al1regu11 | enable source1 field to be aliased |
| Al2regu11 | enable source2 field to be aliased |
| Al0memu11 | enable src/dst field to be aliased |
| Al1memu11 | enable ldst/type field to be aliased |
| Al2memu11 | enable base field to be aliased |
| Al0rdcu11 | select alias register for dest |
| Al1rdcu11 | select alias register for source1 |
| Al2rdcu11 | select alias register for source2 |

Mousetrap multiplexer

The mousetrap multiplexer (104) is a large multiplexer which selects data from one of several sources to route to each field of the machine bus (110). These sources include the macro busses, the alias fields (120), the output of the translation ROM (122), and the instruction fetch logic. The mousetrap drives opcode and operand information from the desired source to outputs (110) if the machine is not scoreboarded or if the pipe is forced; otherwise, it recirculates the current instruction through a delay circuit (106) to place the previous contents of the machine bus (110 back on the machine bus (110). The contents of the machine bus are saved in each clock cycle, so that the information on the bus can be recirculated at any time if the machine gets scoreboarded. The mousetrap outputs are precharged in ph2 and driven or recircultated in ph1. The fields of the machine bus are given in the table III below:

TABLE III

| bus | type | #bits | definition |
|---|---|---|---|
| Opcodeu11 | reg | 5 | main opcode |
| Opcodelu11 | reg | 4 | extension opcode |
| S1adru11 | reg | 7 | source 1 reg address |
| S2adru11 | reg | 7 | source 2 reg address |
| Dstadroutu11 | reg | 7 | destination reg address |
| Baseadru11 | mem | 6 | base reg address |
| Addmodu11 | mem | 4 | RISC address mode |
| Scaleu11 | mem | 3 | scale bits |
| Ldadroutu11 | mem | 6 | src/dst reg address |
| Typeoutu11 | mem | 4 | type of mem access |
| Ldstoutu11 | mem | 4 | type of mem operation |
| Extendbru11 | ctl | 6 | extended branch controls |
| Extucomu11 | ctl | 5 | extended micro commands |

If the first instruction word on the macro busses (macro0) is a RISC register instruction, the mousetrap drives the opcode, source1, source2, and destination on the machine bus from their corresponding macro0 instruction fields. If the instructions on either the first or the second macro busses (macro0 or macro1) are RISC memory instructions, the base address, addressing mode, scale, source/destination, type, and load/store machine busses are driven from their corresponding macro0 or macro1 instruction fields. If the current instruction is part of a microcode flow, the RISC operands can individually be ignored by allowing the machine bus fields to use the alias registers (116) as sources, rather than the macro busses. The operands which can be aliased in this manner are the Source1, Source2, Destination, Base Address, Source/Destination, Type, and Load/Store fields. If the current instruction is the first instruction of a microcode flow, the output of the translation ROM (122) is available as a source for all machine bus fields. This is enabled whenever the translate ready lookahead signal (xltrdyq02) is active. Table IV provides a summary of input fields that can be selected as sources for each machine bus field. Note that all fields additionally have thier own previous contents as a source when the machine bus is recirculating.

TABLE IV

| machine bus field | available sources for each field |
|---|---|
| Opcode | macro0, ucode0 |
| Opcode1 | macro0, ucode0 |
| S1adr | macro0, src1fld, src2fld, srcdstfld, ucode0 |
| S2adr | macro0, src1fld, src2fld, srcdstfld, ucode0 |
| Dstadrout | macro0, src1fld, src2fld, srcdstfld, ucode0 |
| Baseadr | macro0, macro1, src2fld, ucode1 |
| Addmod | macro0, macro1, ucode1 |
| Scaleu11 | macro0, macro1, ucode1 |
| Ldadrout | macro0, macro1, srcdstfld, ucode1, fetch |
| Typeout | macro0, macro1, typefld, ucode1, fetch |

TABLE IV-continued

| machine bus field | available sources for each field |
|---|---|
| Ldstout | macro0, macro1, ldstfld, ucode1, fetch |
| Extendbru | macro0, macro1, ucode1 |

The mousetrap drives the extended branch controls onto the machine bus in order to support miscellaneous branch functions such as the loading and storing of instruction pointers, auto incrementing for call and return through the stack frame, event waiting, loading and storing of special attribute bits such as virtual or stack frame access, and other branch functions such as returning or continuing into microcode.

When the load address instruction is forced by the IFU, scratch register 8 (S8) is always selected by driving the ldadrout bus with a value of 68 h, and a fetch is inserted in the empty time slot by forcing a value of 2 on the ldstout bus and a value of 0Bh on the typeout bus. To support stack frame operations, the ldstout upper bits are driven with extended branch type field.

Post-decode Logic

The instruction decoder contains post decode logic (108) which examines the machine bus (110) for operand specifiers which indicate that assistance is needed through register bypassing (result forwarding) or scoreboarding.

Bypass Detection Logic

Whenever the source register of an instruction is the same as the destination register of the previous instruction, the bypass detection logic (124) notifies the register file that a bypass is necessary by activating the register bypass controls. Since the instruction pipeline makes it impossible for an instruction to read the updated contents of a register when an instruction in the previous clock cycle has altered it, the instruction decoder instructs the register file to forward the result data from the return busses to the source busses without reading the source register. Table V summarizes the bypass condtions which are checked. Bypassing is not signalled if no destination register address is specified in an instruction.

TABLE V

| bypass condition | bypass signal |
|---|---|
| dest reg (pipe2) = base reg (pipe1) | dst2bas1q11 |
| dest reg (pipe2) = source1 reg (pipe1) | dst2s1q11 |
| dest reg (pipe2) = source2 reg (pipe1) | dst2s2q11 |
| dest reg (pipe2) = store reg (pipe1) | dst2st1q11 |
| load reg (pipe2) = base reg (pipe1) | ld2bas1q11 |
| load reg (pipe2) = source1 reg (pipe1) | ld2s1q11 |
| load reg (pipe2) = source2 reg (pipe1) | ld2s2q11 |
| load reg (pipe2) = store reg (pipe1) | ld2st1q11 |

Destination Collision Detection

The destination collision detection logic (126) detects when there is a collision between destination registers. This occurs when there are conflicts between register and memory operations or between register and base addressing operations. In the latter case, the logic (126) detects that the high order bits of the base register are the same as those of the destination register, and the base operation is stopped by asserting stopbas0dst0, which causes memscbok to scoreboard the memory side of the machine. Similarly, it detects if there is a load or store using destination data, and notifies the machine by asserting ldst2dst2, which activates the memscbok signal. (The scoreboarding operation and signals are described in the above-identified application Ser. No. 07/486,407). In either case, the instruction decoder causes the memory side of the machine to be scoreboarded for one clock cycle to force the two operations to be done sequentially. Destination collision detection and scoreboarding occurs in ph2.

While the invention has been particularly shown and described with reference to preferred embodiments thereof, it will be understood by those skilled in the art that the foregoing and other changes in form and detail may be made therein without departing from the scope of the invention.

What is claimed is:

1. An instruction sequencer attached to an instruction bus (98) as a source of microcode flows stored in a main microcode ROM (11) and to a machine bus (110) comprising:

a microcode translation ROM (112) for providing at least one initial instruction of a longer microcode flow;

a mousetrap multiplexer (104) having a first input, a second input, a third input and an output;

said first input of said mousetrap multiplexer (104) being connected to said instruction bus (98), said second input of said mousetrap multiplexer (104) being connected to said microcode translation ROM (112);

said output of said mousetrap multiplexer (104) being connected to said machine bus (110); and, a delay means (106) having a delay input and a delay output (107);

said delay input being connected to said machine bus (110);

said third input of said mousetrap multiplexer (104) being connected to said delay output (107) of said delay means;

said mousetrap multiplexer including selecting means for selecting from one of either said first input, said second input, or said third input.

2. The combination in accordance with claim 1 further comprising:

detection means connected to said machine bus (110) for detecting a condition that a source register of an instruction is the same as a destination register of a previous instruction, said detection means being connected to said selecting means such that a current instruction is recirculated upon said condition that a source register of an instruction is the same as a destination register of a previous instruction.

3. The combination in accordance with claim 1 wherein said microcode translation ROM (112) contains at least a first instruction of each microcode flow to thereby provide quick access to a first operation, which can be executing while a next instruction is being fetched from said main microcode ROM (11);

said microcode translation ROM (112) including means for generating signals for use by said mousetrap multiplexer (104) to aid in choosing an operand source.

4. An instruction sequencer attached to an instruction bus (98) as a source of macro instruction flows stored in a main microcode ROM (11) and to a machine bus (110) upon which said sequencer supplies instructions, said instruction sequencer comprising:

a macroinstruction alias logic (100);

a macroinstruction translation ROM (122);

a mousetrap multiplexer (104);

said mousetrap multiplexer (104) having a first input, a second input, a third input, a fourth input and an output;

said first input of said mousetrap multiplexer (104) being connected to said instruction bus (98);

said second input of said mousetrap multiplexer (104) being connected to said microcode translation ROM (102);

said third input of said mousetrap multiplexer (104) being connected to said microinstruction alias logic (100);

said output of said mousetrap multiplexer (104) being connected to said machine bus (110);

said microcode translation ROM storing at least one instruction of first instructions of each microcode flow of said microcode flows so that said instruction sequencer can fetch and issue microcoded instructions without having to wait for an initial access into said main microcode ROM (11);

a delay means (106) having a delay input and a delay output (107);

said delay input being connected to said machine bus (110);

said fourth input of said mousetrap multiplexer (104) being connected to said delay output (107) of said delay means;

said mousetrap multiplexer including selecting means for selecting from one of either said first input, said second input, said third input or said fourth input.

5. The combination in accordance with claim 4 further including:

a post decoding logic (108);

said post decoding logic (108) including means for detecting a condition that a source register of an instruction is the same as a destination register of a previous instruction said post decoding logic being connected to said selecting means such that a current instruction is recirculated upon said condition that a source register of an instruction is the same as a destination register of a previous instruction.

* * * * *